United States Patent [19]

Srinivasan

[11] Patent Number: 5,237,663

[45] Date of Patent: Aug. 17, 1993

[54] LOW COST DIAGNOSTIC/CONFIGURATION INTERFACE

[75] Inventor: Ram Srinivasan, Sunnyvale, Calif.

[73] Assignee: Hewlett-Packard Company, Palo Alto, Calif.

[21] Appl. No.: 675,238

[22] Filed: Mar. 26, 1991

[51] Int. Cl.$^5$ ............................................. G06F 13/00
[52] U.S. Cl. ............................. 395/325; 364/DIG. 2; 364/927; 364/927.92; 364/932.8; 364/919.5; 364/964
[58] Field of Search ....................... 395/275, 325, 425; 371/15.1, 17, 18, 21.1, 21.2; 364/709.01, 709.09, 709.11

[56] References Cited

U.S. PATENT DOCUMENTS

| | | | |
|---|---|---|---|
| 4,623,920 | 11/1986 | Dufresne et al. | 358/122 |
| 4,792,972 | 12/1988 | Cook, Jr. | 380/20 |
| 4,850,009 | 7/1989 | Zook et al. | 379/96 |
| 4,916,441 | 4/1990 | Gombrich | 340/712 |

Primary Examiner—Debra A. Chun
Attorney, Agent, or Firm—Roland I. Griffin; Alan H. Haggard

[57] ABSTRACT

A computing system has a wireless interface, for example an infrared interface. The infrared interface is used to directly transmit configuration information to and/or receive configuration from a configuration storage device without going through the standard I/O interfaces of the computing system. This is done by connecting the infrared interface directly to the configuration storage device. Alternately, the infrared interface is used to allow direct connection to a memory bus without using an I/O bus. This allows the computing system to send out diagnostic information without using the I/O bus. The infrared interface can be full duplex allowing requests for diagnostic information to be made by a handheld computing system such as a handheld computer or a calculator. The infrared interface may also be used to download data and programming code to a handheld computing system and for receiving data from the handheld computing system.

23 Claims, 3 Drawing Sheets

LOW COST DIAGNOSTIC/CONFIGURATION INTERFACE

BACKGROUND

The present invention concerns a low cost interface used for uploading and downloading configuration, diagnostic and/or other information to a computing system.

Typically, a user may interact with a computing system using one of many standard interfaces. A user may input information to a computer using, for example, a keyboard, a touchscreen, and/or a mouse. A computer, may output information to a user through output devices such as printers, video screens, plotters and voice synthesizers.

The generally available means for input to and output from a computing system require an operating system to be loaded and a sophisticated I/O system to be operating. In the prior art, there is generally no available interface which allows communication with a computing system solely for the purpose of obtaining diagnostic information or for obtaining or changing configuration information without using an existing I/O system.

SUMMARY OF THE INVENTION

In accordance with the preferred embodiment of the present invention there is presented a computing system which has a wireless interface, for example one which uses infrared light beams. In various embodiments of the present invention, the infrared interface is used to directly transmit configuration information to and/or receive configuration from a configuration storage device, e.g., a configuration register, without going through the standard I/O interfaces of the computing system. This is done by connecting the infrared interface directly to the configuration storage device.

In an alternate embodiment of the present invention, the infrared interface is used to allow direct connection to a memory bus without using an I/O bus. This, for example, allows the computing system to send out diagnostic information without using the I/O bus. The infrared interface can be full duplex allowing requests for diagnostic information to be made by a handheld computing system such as a handheld computer or a calculator. Other uses for the present invention include a means for downloading data and programming code to a handheld computing system such as a calculator, and for receiving data from a calculator.

DESCRIPTION OF THE PREFERRED EMBODIMENT

Figure 1:
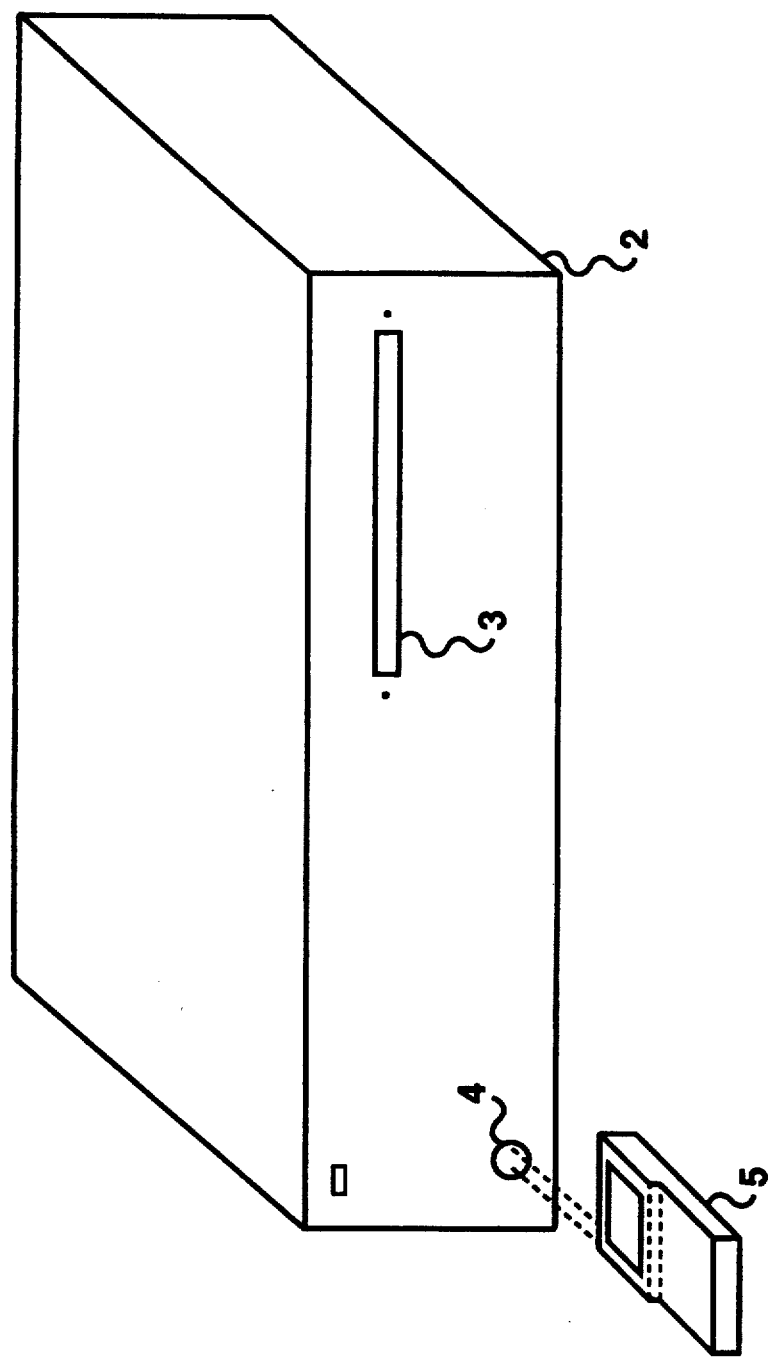
FIG. 1 shows an infrared interface added to a computing system in accordance with the preferred embodiment of the present invention.

FIG. 1 shows a computing system 2 having, for example, a disk drive 3. To computing system 2 has been added a wireless interface system 4 in accordance with the preferred embodiment of the present invention. In the preferred embodiment of the present invention, wireless interface system 4 is an infrared interface system. Infrared interface system 4 may be accessed, for example, by a handheld computing system 5. Handheld computing system 5 may be, for example, a handheld computer or calculator which also has an infrared interface.

Figure 2:
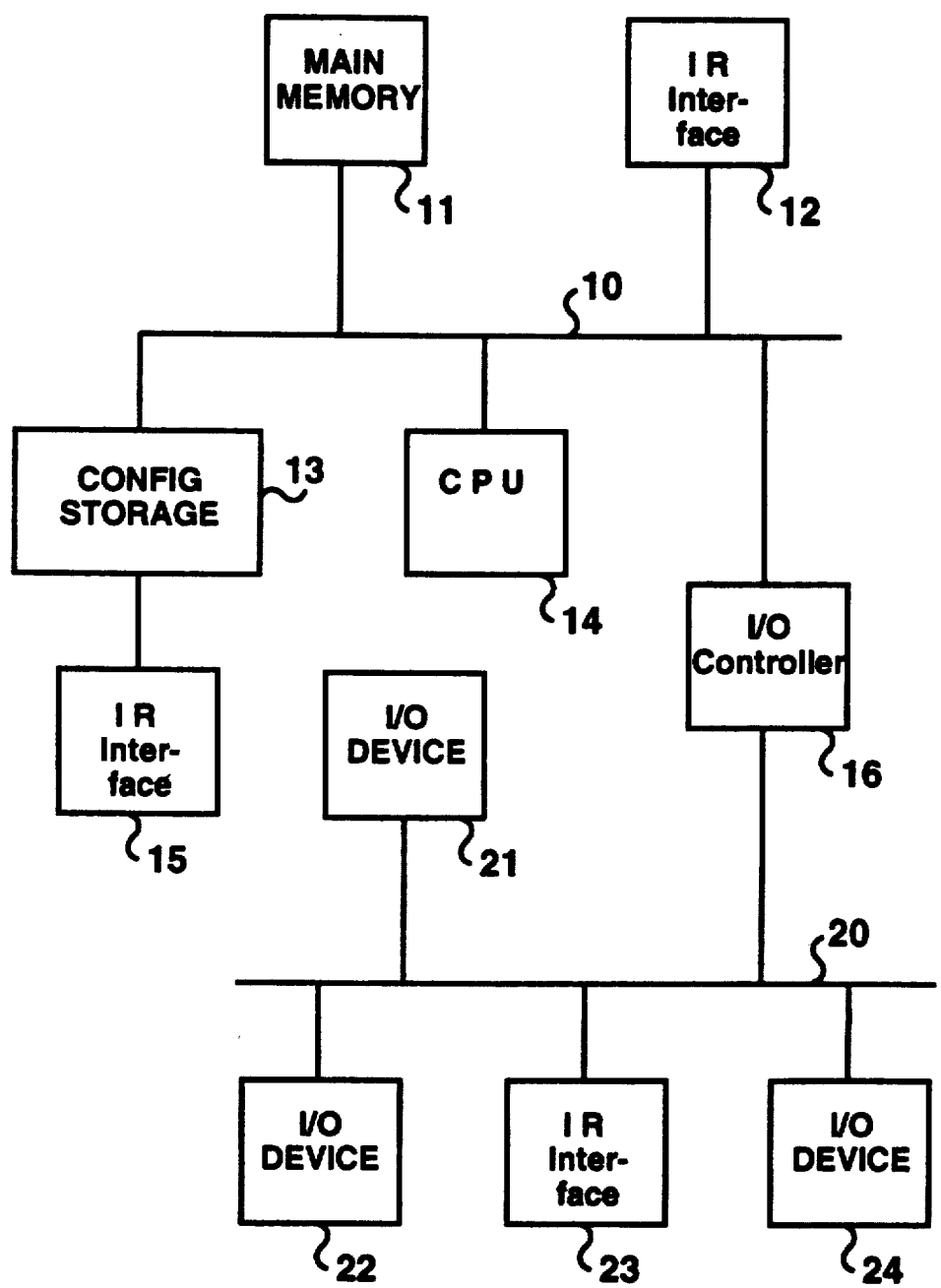
FIG. 2 shows a block diagram of a computing system with shown locations where infrared interfaces may be added in accordance with preferred embodiments of the present invention.

FIG. 2 shows a block diagram of the internal organization of computing system 2, including various locations where an infrared interface are added in different embodiments of the present invention. In computing system 2, a memory bus 10 is used to connect a central processing unit (CPU) 14 to a main memory 11 and an input/output (I/O) controller 16. I/O controller 16 serves as an interface to an I/O bus 20. An I/O device 21, an I/O device 22 and an I/O device 24 are connected to I/O bus 20. I/O devices 21, 22 and 24 provide for standard I/O to computing system 2. These I/O devices may include, for example, a display interface, a keyboard interface, one or more serial I/O ports, one or more parallel I/O ports, etc.

Within various embodiments of computing system 2, an infrared interface is added in different locations depending on the specific purpose of the interface. For example, a configuration storage device 13, e.g., a configuration register is shown connected to memory bus 10. Within configuration storage device 13 is stored configuration information accessible by CPU 14. In one embodiment of the present invention, an infrared interface 15 is connected directly to configuration storage device 13 to facilitate the easy access of configuration information by a technician without the necessity of going through regular I/O channels. This is especially useful for a technician in a manufacturing plant.

For example, using this embodiment of the present invention, the technician can load configuration information directly into computing system 2 from a handheld computer equipped with an infrared interface, such as handheld computing system 5. In the preferred embodiment, on power-up, computing system 2 is designed to take information received from infrared interface 15 and place the information in configuration storage device 13. This allows a technician to power-up computing system 2 and quickly and simply load configuration information into computing system 2 without using wires to connect an I/O device to computing system 2, and without the need to load operating system software into computing system 2. Infrared interface 15 may even be equipped with its own battery power supply so that infrared interface 15 is always ready to receive configuration information. This allows a technician to perform the configuration without the need to connect computing system 2 to an outside power source. Alternately, a separate power plug is added to computing system 2 so that a technician can carry a small power source which may be directly hooked up to infrared interface 15 thus allowing ease of loading configuration information without powering up all of computing system 2.

In one embodiment, infrared interface 15 operates in full duplex mode. This allows a technician to directly read configuration information in configuration storage device 13, as well as write information to configuration storage device 13, without going through regular I/O channels. Alternately, infrared interface 15 may be used only for reading configuration storage device 13.

In another embodiment of the present invention, an infrared interface 12 is connected to memory bus 10. Infrared interface 12 is used, for example, to transmit diagnostic information to a technician. This information is generated, for example, by CPU 14 on a regular basis, or alternately, the diagnostic information is generated upon detection of an error in the system by any device on memory bus 10. The diagnostic information may include firmware check sums. Additionally, infrared interface 12 is implemented to operate in full duplex mode so that through infrared interface 12 a technician may request and receive diagnostic information. The advantage of this embodiment of the present invention is that diagnostic information can be obtained without the necessity of bringing up I/O devices, or when the regular I/O channels are down. Infrared interface 12 can help in diagnosing problems as long as sufficient intelligence is available to activate infrared LEDs within infrared interface 12. For example, infrared interface 12, may contain sufficient intelligence to output diagnostic information even when CPU 14 is inoperable.

Also, in an alternate embodiment, an infrared interface 23 is added to I/O bus 20 as a separate input device. Infrared interface 23 is used, for example, to interface to a wireless portable printer. This printer is used, for example, by a technician for the printing out diagnostic information. Alternately, the printer is used as an inexpensive printer for computer system 2. Infrared interface 23, in an alternate embodiment, is used as a mechanism by which programs or data is downloaded from and/or uploaded to computing system 2 by a handheld computer or calculator equipped with an infrared interface, such as handheld computing system 5.

The present invention utilizes infrared transmission technology because it provides a wireless transmission technology that is low-cost and has low-power usage. Additionally, components for infrared technology are readily available. Further, the design of infrared links is readily understood by those skilled in the art of remote-control units for televisions sets and video cassette recorders.

Infrared transmission has also been used as an interface between low-cost calculators and printers. For example, a Hewlett-Packard Company model number 18C and 28C calculator each include an infrared interface which allows the calculator to be connected to a Hewlett-Packard Company 82240A infrared printer. The hardware implementation of the infrared interface between these calculators and this printer is adapted as the preferred embodiment of the hardware portion of the infrared interface of the present invention.

Figure 3:
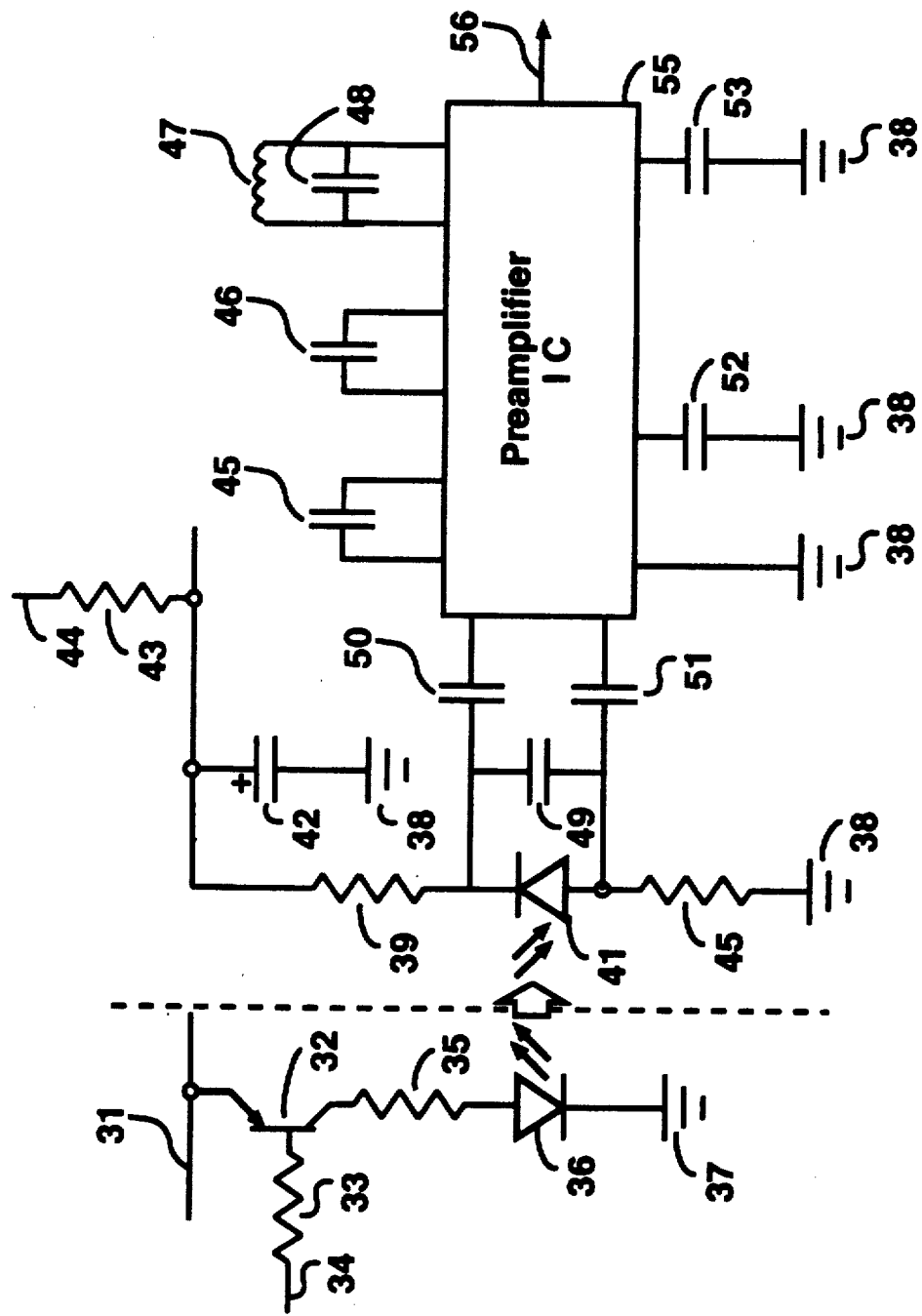
FIG. 3 shows a block diagram of a hardware level implementation of an infrared interface in accordance with a preferred embodiment of the present invention.

For example, FIG. 3 shows hardware which implements an infrared link. For transmission of infrared signals, current is placed through an infrared light emitting diode (LED) 36 to a transmitter ground 37. The current is generated, for example from a five volt power source 31. A transistor circuit including a transistor 32, a resistor 33 and a resistor 35 is used to control current through infrared LED 36. A control signal placed on line 34 with, for example, a modulation frequency of 32.768 kHz is used to encode information sent through the infrared link. The value of resistor 35 is chosen to limit current through infrared LED 36 to about 80 to 160 milliamperes.

Infrared signals transmitted by infrared LED 36 are received by an infrared photo diode 41. Photo diode 41 acts as a weak current source with an amplitude proportional to the incident of light intensity. A sensitive gain-controlled preamplifier provides frequency selectivity, demodulation and conversion of the current from photo diode 41 to logic voltage levels. The preamplifier includes a preamplifier integrated circuit (IC) 55 and various discrete components connected as shown. The discrete components include a compensation capacitor 45, a compensation capacitor 46, an AGC capacitor 52 an output integrator capacitor 53. Values for a capacitor 48 and an inductor 47, which form an LC oscillator, are chosen so that a frequency of oscillation matches the modulation frequency of, for example, 32.768 kHz. A resistor 43 functions as a power supply filter for a five volt power source 44.

Once infrared photo diode 41 generates a current, a pull up resistor 39 and a pull down resistor 40 convert this current into a very small differential voltage. A coupling capacitor 50 and a coupling capacitor 51 feed this voltage differential into preamplifier IC 55. A capacitor 49 provides for high-frequency noise reduction.

Within preamplifier IC 55 are two externally compensated gain stages with automatic gain control. Also included is a tuned synchronous demodulator stage, an output integrator and pulse shaper. After the pulse shaper, signals from the preamplifier IC 55 are forwarded to a receiving unit through an output 56. For more details on this particular infrared interface and on infrared interfaces in general see Steven L. Harper, Robert S. Worsley, and Bruce A Stephens, *An Infrared Link for Low-Cost Calculators and Printers*, Hewlett-Packard Journal, October 1987, pp. 16-20.

The encoding of data through infrared signals is well understood. In the preferred embodiment of the present invention, data is encoded in bit times which are subdivided into half-bit times. A bit time is defined as 28 periods of a 32.768 kHz waveform (approximately 854.5 microseconds). Time intervals are measured from the leading edge of the bursts. A one bit is defined as a burst at the beginning of the first half-bit time with no burst in the second half-bit time. A zero bit is defined as no burst in the first half-bit time and a burst at the beginning of the second half-bit time. A start bit is defined as a burst at the beginning of three consecutive half bit times, an otherwise illegal sequence. Start-bit bursts can have six to nine 32.768 kHz pulses of infrared light.

Each frame of data consists of a start bit followed by 12 data bits. The first four data bits are used for error corrections. The remaining eight bits are a byte of information. There is a delay of at least three half-bit times between frames, measured from the end of the last bit time of a frame to the leading edge of the start bit of the next frame. This gives a maximum data rate of about 78 bytes per second. For more information on transmission and error correction of data see Steven L. Harper, Robert S. Worsley, and Bruce A Stephens, *An Infrared Link for Low-Cost Calculators and Printers*, Hewlett-Packard Journal, October 1987, pp. 16-20, cited above.

The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

I claim:

1. In a computing system, a device for allowing a technician direct access to a CPU, the device comprising:
   an I/O bus;
   a memory bus connected to the CPU;
   an I/O controller connected between the I/O bus and the memory bus for providing for data transfer between the memory bus and the I/O bus; and,
   an infrared interface connected directly to the memory bus, the infrared interface serving to make information stored in the CPU accessible through transmission of data in an infrared transmission beam, without utilizing the I/O bus.

2. A device as in claim 1 wherein the access allowed the technician by the device includes receiving diagnostic information from the CPU.

3. A device as in claim 1 wherein the access allowed the technician by the device includes requesting diagnostic information from the CPU.

4. A device as in claim 1 wherein the access allowed the technician by the device includes both requesting diagnostic information from the CPU and receiving diagnostic information from the CPU.

5. A computing system comprising:
   an I/O bus;
   a memory bus;
   an I/O controller connected between the I/O bus and the memory bus for providing for data transfer between the memory bus and the I/O bus;
   a main memory, connected to the memory bus, for storing computing system data;
   configuration storage means, connected to the memory bus and separate from the main memory, for storing configuration information which pertains to configuration of the computing system; and,
   a wireless interface physically connected to a cabinet which contains the computing system and electrically coupled to the configuration storage means, the wireless interface being for providing communication between the configuration storage means and a separate handheld computing system without utilizing the I/O bus.

6. A computing system as in claim 5 wherein the communication includes transmission of configuration information.

7. A computing system as in claim 6 wherein the transmission of configuration information includes transmission of information from the configuration storage means to the handheld computing system.

8. A computing system as in claim 6 wherein the transmission of configuration information includes transmission of information from the handheld computing system to the configuration storage means.

9. A computing system as in claim 6 wherein the transmission of configuration information includes both transmission of information from the handheld computing system to configuration storage means and transmission of information from the configuration storage device to the handheld computing system.

10. A computing system comprising:
    a CPU which generates diagnostic information;
    an I/O bus;
    a memory bus connected to the CPU;
    an I/O controller connected between the I/O bus and the memory bus for providing for data transfer between the memory bus and the I/O bus; and,
    an infrared interface, physically connected to a cabinet of the computing system and electrically connected to the memory bus, the infrared interface being devoted exclusively to transmission of the diagnostic information between the memory bus and a device external to the computing system, the I/O bus not being used in the transmission of the diagnostic information.

11. A computing system comprising:
    a CPU;
    an I/O bus;
    a memory bus connected to the CPU;
    an I/O controller connected between the I/O bus and the memory bus for providing for data transfer between the memory bus and the I/O bus; and,
    an infrared interface, physically connected to a cabinet of the computing system and electrically coupled to the memory bus, the infrared interface being devoted exclusively to transmission of diagnostic and configuration information between the memory bus and a device external to the computing system, the I/O bus not being used in the transmission of diagnostic information.

12. A computing system comprising:
    an I/O bus;
    a memory bus;
    an I/O controller connected between the I/O bus and the memory bus for providing for data transfer between the memory bus and the I/O bus;
    a main memory, connected to the memory bus, for storing computing system data;
    configuration storage means, connected to the memory bus and separate from the main memory, for storing configuration information which pertains to configuration of the computing system; and,
    an infrared interface physically connected to a cabinet of the computing system and electrically coupled to the configuration storage means, the infrared interface being devoted exclusively to transmission of configuration information between the configuration storage means and a device external to the computing system, without utilizing the I/O bus.

13. A computing system as in claim 12 wherein the external device is a handheld computing system.

14. A computing system as in claim 13 wherein the transmission of configuration information includes transmission of information from the handheld computing system to the configuration storage means.

15. A computing system as in claim 13 wherein the transmission of configuration information includes both transmission of information from the handheld computing system to the configuration storage means and transmission of information from the configuration storage means to the handheld computing system.

16. A method by configuration information is obtained from a computing system which utilizes an I/O bus, a memory bus and an I/O controller connected between the I/O bus and the memory bus, the I/O controller providing for data transfer between the memory bus and the I/O bus, the configuration information pertaining to configuration of the computing system, the method comprising the steps of:
    (a) storing, by the computing system, configuration information in a configuration storage device which is separate from a computing system main memory;
    (b) obtaining the configuration information from the configuration storage device by a wireless interface, without utilizing the I/O bus; and, (c) transmitting, without utilizing the I/O bus, the configuration information by the wireless interface to a handheld computing system.

17. A method as in claim 16 wherein the wireless interface uses infrared light beams.

18. A method by which a computing system is configured, the computing system utilizing an I/O bus, a memory bus and an I/O controller connected between the I/O bus and the memory bus, the I/O controller providing for data transfer between the memory bus and the I/O bus, the method comprising the steps of:
(a) storing, by the computing system, configuration information which pertains to configuration of the computing system in a configuration storage device which is separate from a main memory of the computing system; and,
(b) transmitting new configuration information by a handheld computing system, through a wireless interface to a configuration storage device within the computing system without placing the new configuration information in the main memory and without utilizing the I/O bus.

19. A method as in claim 18 wherein the wireless interface uses infrared light beams.

20. A computing system which allows a technician to access configuration information which pertains to configuration of the computing system, the computing system comprising:
an I/O bus;
a memory bus;
an I/O controller connected between the I/O bus and the memory bus for providing for data transfer between the memory bus and the I/O bus;
a main memory, connected to the memory bus, for storing computing system data;
configuration storage means, connected to the memory bus and separate from the main memory, for storing configuration information; and,
an infrared interface connected to the configuration storage means, the infrared interface serving to make configuration information in the configuration storage means accessible through transmission of data in an infrared transmission beam, without utilizing the I/O bus.

21. A computing system as in claim 20 wherein the access provided by the infrared interface includes an ability to read the configuration information in the configuration storage means.

22. A computing system as in claim 20 wherein the access the access provided by the infrared interface includes an ability to change the configuration information in the configuration storage means.

23. A device as in claim 20 wherein the access the access provided by the infrared interface includes an ability both to read the configuration information in the configuration storage means and to change the configuration information in the configuration storage means.

* * * * *